(12) United States Patent
Hrauda et al.

(10) Patent No.: US 12,537,610 B2
(45) Date of Patent: Jan. 27, 2026

(54) RADIO FREQUENCY SIGNAL TRACKING DURING TRANSMISSION OF NEAR-FIELD COMMUNICATION COMMANDS

(71) Applicant: NXP B.V., Eindhoven (NL)

(72) Inventors: Wolfgang Hrauda, Graz (AT); Mark Feichtinger, Graz (AT); Ulrich Andreas Muehlmann, Graz (AT)

(73) Assignee: NXP B.V., Eindhoven (NL)

(*) Notice: Subject to any disclaimer, the term of this patent is extended or adjusted under 35 U.S.C. 154(b) by 393 days.

(21) Appl. No.: 18/218,942

(22) Filed: Jul. 6, 2023

(65) Prior Publication Data
US 2025/0015904 A1    Jan. 9, 2025

(51) Int. Cl.
H04B 5/72    (2024.01)
H04B 17/10   (2015.01)

(52) U.S. Cl.
CPC .............. *H04B 17/104* (2015.01); *H04B 5/72* (2024.01)

(58) Field of Classification Search
CPC .................................. H04B 5/72; H04L 12/28
USPC ......................................... 370/329, 401, 403
See application file for complete search history.

(56) References Cited

U.S. PATENT DOCUMENTS

| | | |
|---|---|---|
| 9,760,883 B1 | 9/2017 | Wade |
| 11,387,910 B2 | 7/2022 | Yasuda et al. |
| 2015/0303904 A1 | 10/2015 | Senaratne et al. |
| 2019/0190554 A1 | 6/2019 | Srinivasan et al. |
| 2024/0005398 A1* | 1/2024 | Sajda ............... G06Q 40/04 |

FOREIGN PATENT DOCUMENTS

EP    2639974 A2    9/2013

OTHER PUBLICATIONS

International Organization for Standardization/International Electrotechnical Commission, "Identification Cards—Contactless Integrated Circuit(s) Cards—Proximity Cards—Part 3: Initialization and Anticollision", ISO/IEC 14443-3, First Edition; Feb. 1, 2001; 58 pages.
Zhao, T. et al., "Optimal Operation Point Tracking Control for Inductive Power Transfer System", 2015 IEEE Wireless Power Transfer Conference (WPTC); May 13, 2015, pp. 1-4.

* cited by examiner

*Primary Examiner* — Dang T Ton

(57) ABSTRACT

A near-field communication (NFC) device is configured to track the amplitude associated with a received radio frequency (RF) signal while transmitting a different RF signal indicating a command. To this end, the NFC device includes tracking circuitry configured to track the amplitude associated with the received RF signal based on a modulation state indicated by a modulation envelope associated with the transmitted RF signal. In response to the modulation envelope indicating a modulated state, the tracking circuitry enters an idle state and does not track the amplitude associated with the received RF signal. In response to the modulation envelope indicating an unmodulated state, tracking circuitry tracks the amplitude associated with the received RF signal.

20 Claims, 6 Drawing Sheets

RADIO FREQUENCY SIGNAL TRACKING DURING TRANSMISSION OF NEAR-FIELD COMMUNICATION COMMANDS

BACKGROUND

Radio frequency (RF) receivers for near-field communication (NFC) typically implement a regulation mechanism that controls signal gain stages and offsets compensation for the removal of an RF carrier signal from received RF signals. Often, the target of the regulation mechanism is to bring a received RF signal into an appropriate dynamic range that is able to be handled by the system. However, within some NFC systems, a received RF signal is subject to certain dynamics that arise during the transmission of the RF signal with such dynamics determined by the properties and features of the NFC systems. Due to these dynamics, the likelihood that a continuous change in the observed amplitude of the received RF signal is increased. Because of this potential for continuous change in the observed amplitude, conventional NFC systems are not able to sufficiently remove the RF carrier signal from the received RF signal and, as such, are not able to sufficiently demodulate data signals from the received RF signal.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
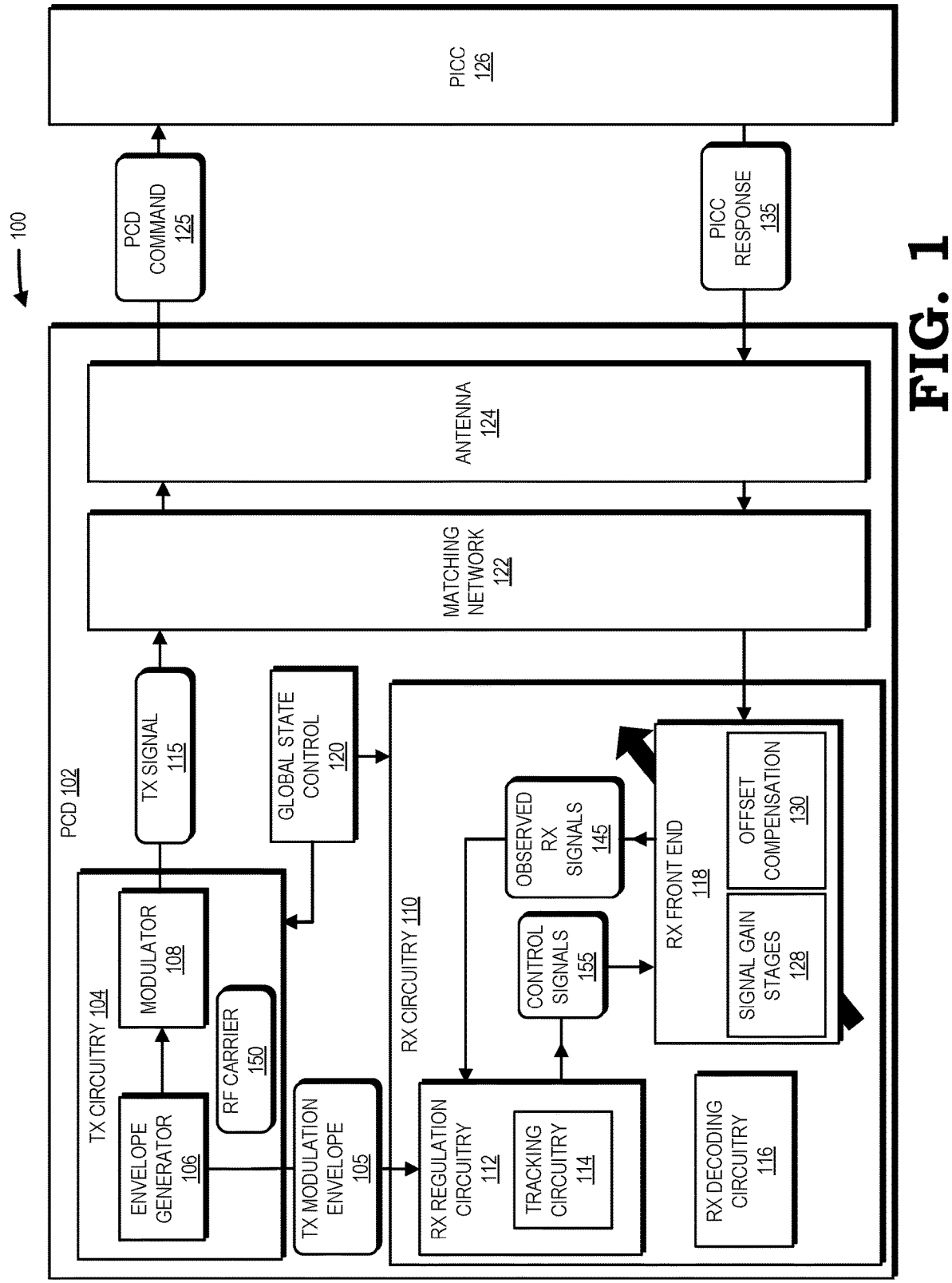
FIG. 1 is a block diagram of a near-field communication (NFC) system configured to exchange data between a proximity coupling device (PCD) and a proximity inductive coupling card (PICC), in accordance with some embodiments.

Within near-field communication (NFC) systems, a proximity coupling device (PCD) is configured to inductively couple to a proximity integrated circuit card (PICC) so as to allow data, power, or both to be transmitted between the PCD and the PICC according to one or more NFC protocols. To this end, the PCD is configured to first generate a radio frequency (RF) carrier signal and transmit the RF carrier signal by an antenna of the PCD toward the PICC. In response to receiving the transmitted RF carrier signal from the PCD, at least a portion of the PICC is configured to power up and transmit the RF carrier signal back to the PCD such that the PCD and PICC are inductively coupled and able to transmit and receive data from one another. To transmit data, such as a PDC command or PICC response, the PCD, PICC, or both configured to modulate a data signal onto the RF carrier signal using a modulation envelope and transmit the modulated RF carrier signal to the PDC or PICC, respectively. After receiving a modulated RF carrier signal, the PCD, PICC, or both are configured to demodulate the modulated RF carrier signal to determine the data signal.

To demodulate a received modulated RF carrier signal to determine a received data signal, for example, a PCD is configured to implement circuitry configured to apply signal gain stages, offset compensation, or both to the received modulated RF carrier signal. That is to say, the PCD includes circuitry configured to remove the RF carrier signal from a received modulated RF carrier signal to determine a received data signal by, for example, applying signal gain stages, offset compensation, or both. To control these signal gain stages and offset compensation to remove the RF carrier signal, the PCD includes a receiver (RX) regulation circuitry configured to monitor a property of the RF signals received at the antenna of the PCD, signals determined from the RF signals, or both during a start-up phase of the PCD. Based on the monitored property during the start-up phase, the RX regulation circuitry determines one or more parameters to configure the signal gain stages and offset compensation such that the signal gain stages and offset compensation remove the RF carrier signal from received modulated RF signals. However, under certain conditions, the RF signals received at the antenna of the PCD are subject to dynamics that cause continuous changes in the amplitude of the received RF signals. Under such conditions, the RX regulation circuitry cannot sufficiently determine parameters to configure the signal gain stages and offset compensation such that the signal gain stages and offset compensation remove the RF carrier signal from received modulated RF signals.

To determine parameters to configure the signal gain stages and offset compensation under these conditions, the PCD further includes a tracking circuitry configured to monitor one or more properties of received RF signals, signals determined from the received RF signals, or both during certain time windows after the start-up phase of the PCD. For example, the tracking circuitry is configured to monitor a property of received RF signals before a PCD command is transmitted to the PICC and after the PCD command has been transmitted but before a PICC response has been received from the PICC. Based on the monitored property of the received RF signals during these time windows, the tracking circuitry determines one or more parameters to configure the signal gain stages and offset compensation such that the signal gain stages and offset compensation remove the RF signal from RF signals received from the PICC. However, after a PCD command has been transmitted to the PICC, the PCD must be ready for the reception of a modulated RF signal received from the PICC, such as a PICC response, within a predetermined time based on NFC protocols.

As such, systems and techniques disclosed herein are directed to helping the PCD be ready for the reception of a modulated RF signal after sending a PCD command. To this end, the PCD includes a tracking circuitry configured to monitor the properties of received RF signals from the PICC, signals determined from the received RF signals, or both while the PCD transmits the PCD command. To help the tracking circuitry monitor the properties of received RF signals while a PCD command is transmitted, the tracking circuitry is configured to monitor the properties of received RF signals based on a state of the modulation envelope used to modulate the RF signal including a PCD command. While a PCD command is being transmitted and in response to the modulation envelope indicating the transmitted RF signal is in a modulated state, the tracking circuitry is idle and does not track the properties of received RF signals, signals determined from the received RF signals, or both. Further, while a PCD command is being transmitted and in response to the modulation envelope indicating a transmitted RF signal is in an unmodulated state, the tracking circuitry is configured to monitor the properties of received RF signals, signals determined from the received RF signals, or both. Based on the monitored properties of the received RF signals, signals determined from the received RF signals, or both, the tracking circuitry then determines one or more parameters to configure the signal gain stages and offset compensation such that the signal gain stages and offset compensation remove the RF carrier signal from an impending PICC response. In this way, the tracking circuitry is configured to monitor the properties of received RF signals, signals determined from the received RF signals, or both while a PCD command is transmitted. Tracking the properties of received RF signals, signals determined from the received RF signals, or both when a PCD command is transmitted helps the PCD stay close to or quickly reach a sufficiently optimal set of parameters for the reception of a modulated RF signal received from the PICC, helping ensure the PCD is ready to receive the modulated RF signal from the PICC.

As used herein, the term "circuitry" includes hardwired circuitry, programmable circuitry, or a combination thereof. For example, circuitry may include circuitry of an application-specific integrated circuit (ASIC) that is hardwired or hardcoded to perform corresponding functions, one or more processors that execute software stored in one or more memories or other storage media to perform corresponding functions, programmable logic that has been programmed to perform corresponding functions, or some combination thereof.

FIG. 1 illustrates an NFC communication system 100, in accordance with some embodiments. NFC communication system 100 includes, for example, a first NFC device (e.g., PCD 102) configured to inductively couple to a second NFC device (e.g., PICC 126) such that data, power, or both are transmitted and received between the NFC devices. To this end, PCD 102 includes transmitter (TX) circuitry 104 configured to generate an RF carrier signal 150 having a frequency associated with NFC-based communications (e.g., 13.56 MHz). In embodiments, after generating the RF carrier signal 150, transmission circuitry (TX circuitry) 104 provides the RF carrier signal 150 to matching network 122 which, in turn, provides the RF carrier signal 150 to antenna 124. Matching network 122, for example, includes a circuit including one or more electrical components (resistors, capacitors, inductors, potentiometers) configured to match the impedance of antenna 124 to the impedance of TX circuitry 104, the impedance of RX circuitry 110, or both. Antenna 124 includes, for example, a coil inductor and is configured to transmit the RF carrier signal 150 toward PICC 126. For example, antenna 124 emits a magnetic field based on the RF carrier signal 150 toward PICC 126. In response to PICC 126 receiving the RF carrier signal 150 (e.g., being in the magnetic field emitted by antenna 124), at least a portion of PICC 126 powers on allowing data to be transmitted between PCD 102 and PICC 126.

To transmit a data signal to PICC 126, PCD 102 is configured to modulate a data signal on the RF carrier signal 150 transmitted by PCD 102. As an example, PCD 102 is configured to modulate a data signal on the RF carrier signal 150 using amplitude-shift keying (ASK) modulation. To modulate a data signal on the RF carrier signal 150, TX circuitry 104 of PCD 102 includes envelope generator 106 that includes circuitry configured to generate a TX modulation envelope 105. The TX modulation envelope 105, for example, represents the maximum amplitudes, minimum amplitudes, or both of a modulated RF carrier signal 150. That is to say, the TX modulation envelope 105 represents the modulation levels resulting from the modulation of a data signal on the RF carrier signal 150. As an example, TX modulation envelope 105 represents the modulation levels resulting from modulating a data signal onto the RF carrier signal 150 using ASK modulation. In embodiments, TX circuitry 104 is configured to provide the TX modulation envelope 105 to modulator 108. Modulator 108 includes circuitry configured to modulate a data signal on the RF carrier signal 150 based on the TX modulation envelope 105. For example, modulator 108 modulates the RF carrier signal 150 based on the TX modulation envelope 105 such that the modulated RF carrier signal 150 indicates a data signal. Further, modulator 108 combines the modulated RF carrier signal with the unmodulated RF carrier signal 150 to produce TX signal 115. As such, for example, TX signal 115 includes a combination of a modulated RF carrier signal and an unmodulated RF carrier signal and indicates a data signal. Antenna 124 then transmits TX signal 115 to PICC 126. According to some embodiments, the data signal indicated by TX signal 115 includes one or more PCD commands 125 associated with NFC protocols. These PCD commands 125 include, for example, PICC selection commands, request commands, wake-up commands, anticollision commands, and the like. After sending TX signal 115 that indicates one or more PCD commands 125, PCD 102 is configured to receive one or more RF signals from PICC 126 that indicate a data signal including one or more PICC responses 135 associated with NFC protocols. These PICC responses 135, for example, are transmitted by PICC 126 in response to a PCD command 125.

To receive a data signal from PICC 126, antenna 124 of PCD 102 first receives an RF signal indicating a data signal from PICC 126 and provides the received (RX) RF signal to RX circuitry 110. According to embodiments, RX circuitry 110 includes a receiver front end (RX front end) 118 that includes circuitry implementing a mixer, one or more signal gain stages 128, offset compensation 130, or both configured to remove the RF carrier signal 150 from the RX RF signal to produce an RX baseband signal and bring it into the supported voltage range of the RX circuitry 110. After applying one or more signal gain stages 128, offset compensation 130, or both to the RX RF signal to produce the RX baseband signal, RX front end 118 provides the RX baseband signal to RX decoding circuitry 116. RX decoding circuitry 116, for example, is configured to demodulate the RX baseband signal to determine the data signal indicated in the RX RF signal. For example, RX decoding circuitry 116 implements one or more ASK demodulation techniques to demodulate the RX baseband signal to determine the data signal indicated in the RX RF signal. In embodiments, to help remove the RF carrier signal 150 from an RX RF signal, RX circuitry 110 includes RX regulation circuitry 112 configured to control one or more signal gain stages 128, offset compensation 130, or both implemented by RX front end 118. As an example, RX regulation circuitry 112 generates and provides one or more control signals 155 that indicate one or more parameters for one or more signal gain stages 128, offset compensation 130, or both. Based on the control signals 155, RX front end 118 then adjusts one or more signal gain stages 128, offset compensation 130, or both to help remove the RF carrier signal 150 from an RX RF signal.

To determine parameters for one or more control signals 155, RX regulation circuitry 112 is configured to monitor one or more properties of one or more RX signals during a connection start-up state of PCD 102. These RX signals, for example, include RX RF signals received by PCD 102, RX front-end signals determined by RX front end 118 (e.g., an RX baseband signal), or both. Further, the properties of an RX signal, for example, include the amplitude of the signal, phase of the signal, frequency of a signal, and the like. The connection start-up state, for example, includes PCD 102 preparing to transmit a TX signal 115 indicating one or more PCD commands 125 to PICC 126. That is to say, the connection start-up state includes a time before a TX signal 115 indicating one or more PCD commands 125 is sent to PICC 126. During the connection start-up state of PCD 102, RX regulation circuitry 112 is configured to measure one or more properties (e.g., amplitude, phase, wavelength) of one or more RX signals received from PICC 126. For example, referring to the example embodiment of FIG. 1, RX regulation circuitry 112 is configured to measure one or more properties of observed RX signals 145 received from PICC 126. Observed RX signals 145, for example, includes an observed RX RF signal received from PICC 126, one or more observed RX front-end signals (e.g., RX baseband signals) associated with an RX RF signal received from PICC 126, or both. Based on the measured properties of observed RX signals 145 (e.g., tracked property associated with the RX RF signal), RX regulation circuitry 112 generates one or more parameters. For example, RX regulation circuitry 112 estimates the RF carrier signal 150 as a function of the measured properties of observed RX signals 145. From the estimated RF carrier signal 150, RX regulation circuitry 112 determines one or more parameters for the signal gain stages, offset compensation, or both implemented by RX front end 118 so as to remove the estimated RF carrier signal 150 from RX signals from PICC 126. As another example, in response to a measured properties of observed RX signals 145 being less than or greater than a predetermined threshold, RX regulation circuitry 112 determines one or more parameters for the signal gain stages, offset compensation, or both implemented by RX front end 118 so as to bring the amplitude of observed RX signals 145 closer to the predetermined threshold.

However, in some embodiments, PCD 102 is subject to dynamics that cause an increase or decrease in the measured properties of observed RX signals 145. As an example, when PCD 102 is configured to provide power to PICC 126 via inductive coupling, the transfer of power from PCD 102 to PICC 126 is able to cause a continuous change in the amplitudes of observed RX signals 145 over a certain amount of time (e.g., it might be caused by capacitors in a rectifier on the PICC being charged and discharged). Due to these dynamics causing changes in the measured properties of observed RX signals 145, RX regulation circuitry 112 cannot sufficiently determine parameters to configure the signal gain stages 128 and offset compensation 130 so as to remove the RF carrier signal 150 from an RX signal from PICC 126.

To help compensate for the dynamics PCD 102 is subject to, PCD 102 includes tracking circuitry 114 included in or otherwise connected to RX regulation circuitry 112. Tracking circuitry 114 is configured to take one or more measurements of the properties of observed RX signals 145 during one or more states of PCD 102, for example, a waiting for PICC response state, receive PICC response state, or both. The waiting for PICC response state, for example, represents an operational state of PCD 102 during a period after a TX signal 115 indicating a PCD command 125 has been transmitted to PICC 126 but before an RX RF signal from PICC 126 indicating an expected PICC response 135 has been received. That is to say, for example, the waiting for PICC response state includes a predetermined amount of time PCD 102 expects to receive an RX RF signal from PICC 126 indicating an expected PICC response 135 after transmitting a TX signal 115 indicating a PCD command 125. The receive PICC response state, for example, represents a predetermined amount of time over which PCD 102 is expected to receive an RX RF signal from PICC 126 indicating a PICC response 135.

According to embodiments, while PCD 102 is in the waiting for PICC response state, tracking circuitry 114 is configured to take one or more measurements of one or more properties of observed RX signals 145. Based on a measured property (e.g., measured amplitude, measured phase, measured wavelength) of observed RX signals 145, tracking circuitry 114 then determines one or more parameters for signal gain stages 128, offset compensation 130, or both. As an example, based on the measured properties of observed RX signals 145, tracking circuitry 114 predicts what the state (e.g., amplitude) of the RF carrier signal 150 will be when an RX RF signal from PICC 126 indicating a PICC response 135 is received. Based on the predicted state of the RF carrier signal 150, tracking circuitry 114 then determines one or more parameters for signal gain stages 128, offset compensation 130, or both so as to remove the predicted RF carrier signal 150 from an upcoming RX RF signal indicating a PICC response 135. As another example, in response to the measured property of observed RX signals 145 being less than or greater than a predetermined threshold, tracking circuitry 114 determines one or more parameters for signal gain stages 128, offset compensation 130, or both so as to bring the property of observed RX signals 145 closer to the predetermined threshold (e.g., determines one or more parameters for signal gain stages 128, offset compensation 130, or both so as to have the property of observed RX signals 145 approach the value indicated by the predetermined threshold). After determining such parameters, tracking circuitry 114 then provides one or more control signals 155 indicating the parameters to RX front end 118. Further, in embodiments, while PCD 102 is in a receive PICC response state, tracking circuitry 114 is configured to take one or more measurements of one or more properties of observed RX signals 145. That is to say, while PCD 102 is receiving an RX RF signal indicating a PICC response 135, tracking circuitry 114 is configured to take one or more measurements of the amplitude of observed RX signals 145. According to some embodiments, tracking circuitry 114 is configured to take fewer measurements, take less frequent measurements, or both of observed RX signals 145 while PCD 102 is in a receive PICC response state than when PCD 102 is in a waiting for PICC response state. Based on the measured properties of observed RX signals 145 while PCD 102 is in a receive PICC response state, tracking circuitry 114 determines one or more parameters for signal gain stages 128, offset compensation 130, or both so as to help remove the RF carrier wave from the RX RF signal indicating the PICC response 135, keep the properties of observed RX signals 145 close to a predetermined threshold, or both.

However, tracking observed RX signals 145 in this way (e.g., only while PCD 102 is in the waiting for PICC response state), requires PCD 102 to be ready for the reception of an RX RF signal indicating a PICC response 135 in the amount of time associated with the waiting for PICC response state (e.g., a frame delay time). That is to say, after sending a TX signal 115 indicating a PCD command 125, the PCD 102 only has from the beginning of the waiting for PICC response state to the end of the waiting for PICC response state to be ready for the reception of an RX RF signal indicating a PICC response 135. As such, to help the PCD 102 stay close to or quickly reach a sufficiently optimal set of parameters for the reception of an RX RF signal indicating a PICC response 135, tracking circuitry 114 is configured to take one or more measurements of one or more properties of observed RX signals 145 during a transmit PCD command state of PCD 102. The transmit PCD command state, for example, represents the period of time over which PCD 102 transmits a TX signal 115 indicating a PCD command 125 to PICC 126. To this end, tracking circuitry 114 is configured to measure one or more properties of observed RX signals 145 based on TX modulation envelope 105. For example, tracking circuitry 114 is configured to track (e.g., take one or more measurements of one or more properties of) observed RX signals 145 based on the modulation state of the RF carrier wave indicated by TX modulation envelope 105. This modulation state represents, as an example, whether a data signal is being modulated on the RF carrier wave and includes a modulated state indicating a data signal is being modulated on the RF carrier wave and an unmodulated state indicating that no data signal is being modulated on the RF carrier wave. As an example, based on the TX modulation envelope 105 being above a predetermined threshold (e.g., being high), tracking circuitry 114 determines the RF carrier signal 150 is in a modulated state. In response to the TX modulation envelope 105 indicating the RF carrier signal 150 is in a modulated state, tracking circuitry 114 enters an idle state and does not track observed RX signals 145.

Based on the TX modulation envelope 105 being below a predetermined threshold (e.g., being low), tracking circuitry 114 determines the RF carrier signal 150 is in an unmodulated state. In response to the TX modulation envelope 105 indicating the RF carrier signal 150 is in an unmodulated state, tracking circuitry 114 begins to track observed RX signals 145. According to some embodiments, in response to the TX modulation envelope 105 indicating the RF carrier signal 150 is in an unmodulated state, tracking circuitry 114 is configured to first wait a predetermined amount of time before tracking observed RX signals 145. In this way, tracking circuitry 114 helps ensure that the RF carrier signal 150 is in an unmodulated state before tracking observed RX signals 145. While tracking observed RX signals 145 when PCD 102 is in a transmit PCD command state, tracking circuitry 114 is configured to determine one or more parameters for signal gain stages 128, offset compensation 130, or both based on the measured properties of observed RX signals 145. For example, tracking circuitry 114 is configured to, based on one or more measured properties of observed RX signals 145, determine an effect one or more dynamics have on observed RX signals 145 and then determine one or more parameters for signal gain stages 128, offset compensation 130, or both so as to compensate for these dynamics. As an example, tracking circuitry 114 is configured to compare one or more measurements of one or more properties of observed RX signals 145 to a predetermined target threshold (e.g., a RX regulation target). Based on the comparison of the measurements of the properties of observed RX signals 145 to a predetermined target threshold, tracking circuitry 114 determines one or parameters for signal gain stages 128, offset compensation 130, or both so as to bring the measured properties of observed RX signals 145 closer to one or more properties indicated by the predetermined target threshold.

For example, in response to the one or more measurements of the amplitude of observed RX signals 145 being greater than the predetermined target threshold, tracking circuitry 114 determines one or parameters for signal gain stages 128, offset compensation 130, or both so as to reduce the amplitude of observed RX signals 145. In response to the one or more measurements of the amplitude of observed RX signals 145 being less than the predetermined target threshold, tracking circuitry 114 determines one or parameters for signal gain stages 128, offset compensation 130, or both so as to increase the amplitude of observed RX signals 145. In this way, tracking circuitry 114 helps compensate for potential dynamics affecting an expected RX signal indicating a PICC response 135 by tracking the observed RX signals 145 while PCD 102 is in a transmit PCD command state. That is to say, tracking the observed RX signals 145 while PCD 102 is in a transmit PCD command state helps tracking circuitry 114 to bring the observed RX signals 145 closer to a target threshold which, in turn, helps PCD 102 more accurately demodulate a data signal (e.g., PICC response 135) from an upcoming RX signal from PICC 126.

According to embodiments, PCD 102 includes global state control 120 that includes circuitry configured to control the state of PCD 102. For example, global state control 120 is configured to send out one or more signals to TX circuitry 104, RX circuitry 110, or both that cause PCD 102 to enter the connection start-up state, transmit PCD command state, waiting for PICC response state, receive PICC response state, or any combination thereof. These signals sent from global state control 120 indicate, for example, predetermined times associated with one or more operational states of PCD 102, data signals to modulate on the RF carrier signal 150, commands to activate circuitry, commands for circuitry to enter an idle state, or any combination thereof, to name a few.

Figure 2:
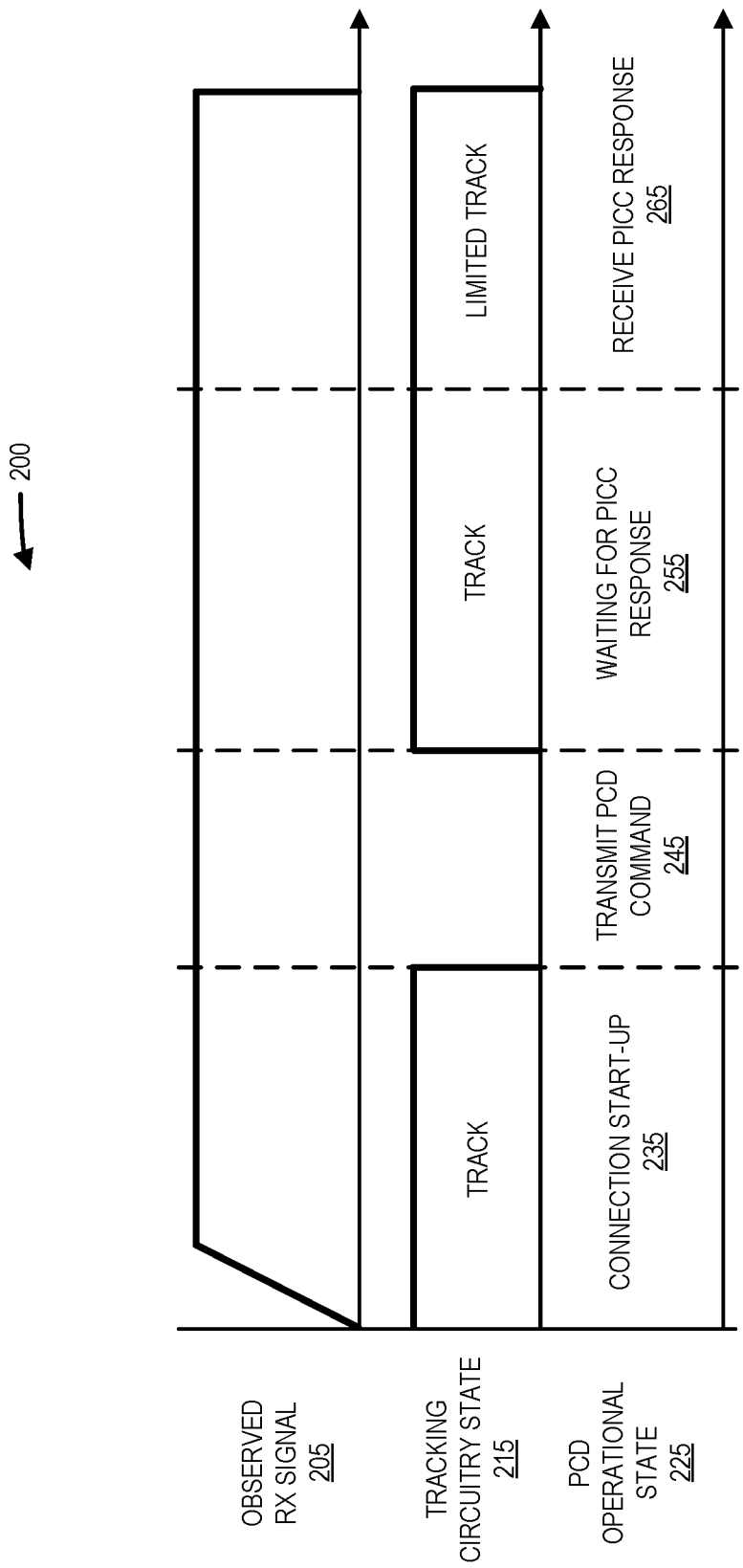
FIG. 2 is a timing diagram of the state of tracking circuitry configured to track received signals, in accordance with some embodiments.

Referring now to FIG. 2, an example timing diagram 200 of the state of a tracking circuitry configured to track an observed RX signal is presented. According to embodiments, the example timing diagram 200 presents the state of tracking circuitry 114 (e.g., tracking circuitry state 215) during different PCD operational states 225 of PCD 102. For example, as demonstrated by the example timing diagram 200, while PCD 102 is in a connection start-up state 235, tracking circuitry 114 is in a track state and is configured to take one or more measurements of one or more properties (e.g., amplitude, phase, wavelength) of observed RX signals 145. Connection start-up state 235 includes, for example, PCD 102 preparing to transmit a TX signal 115 indicating one or more PCD commands 125 according to one or more NFC protocols. Referring to the example embodiment presented in FIG. 2, the measured amplitude (e.g., tracked amplitude) of observed RX signals 145 is represented in example timing diagram 200 as observed RX signal 205. When PCD 102 is in a transmit PCD command state 245, tracking circuitry 114 is in an idle state and is configured not to measure the property (e.g., amplitude) of observed RX signals 145. Transmit PCD command state 245 includes, for example, PCD 102 transmitting a TX signal 115 indicating a PCD command 125 to PICC 126 over a predetermined amount of time and according to one or more NFC protocols. Additionally, as demonstrated by example timing diagram 200, while PCD 102 is in a waiting for PICC response state 255, tracking circuitry 114 is in a track state and is configured to take one or more measurements of one or more properties of observed RX signals 145. The waiting for PICC response state, for example, represents the operational state of PCD 102 during an amount of time (e.g., a predetermined minimum amount of time) after a TX signal 115 indicating a PCD command 125 has been transmitted to PICC 126 but before an RX signal from PICC 126 indicating an expected PICC response 135 has been received. In other words, the waiting for PICC response state 255 includes PCD 102 waiting a predetermined amount of time to receive an RX signal from PICC 126 indicating an expected PICC response 135.

Further, while PCD 102 is in a receive PICC response state 265, tracking circuitry 114 is in a limited track state and is configured to take one or more measurements of one or more properties of observed RX signals 145. In embodiments, while in a limited track state, tracking circuitry 114 is configured to take fewer measurements of the properties of observed RX signals 145, take less frequent measurements of the properties of observed RX signals 145, or both than when tracking circuitry 114 is in a track state. However, only tracking observed RX signals 145 during the connection start-up state 235 and waiting for PICC response state 255 requires PCD 102 to be ready for the reception of the RF signal indicating a PICC response 135 by the end of the waiting for PICC response state 255. Because PCD 102 only has a limited amount of time (e.g., the waiting for PICC response state 255) to prepare for the reception of the RF signal indicating a PICC response 135, PCD 102 is more likely to be too slow to complete the preparation and not be able to sufficiently demodulate the PICC response 135 from an RX RF signal.

Figure 3:
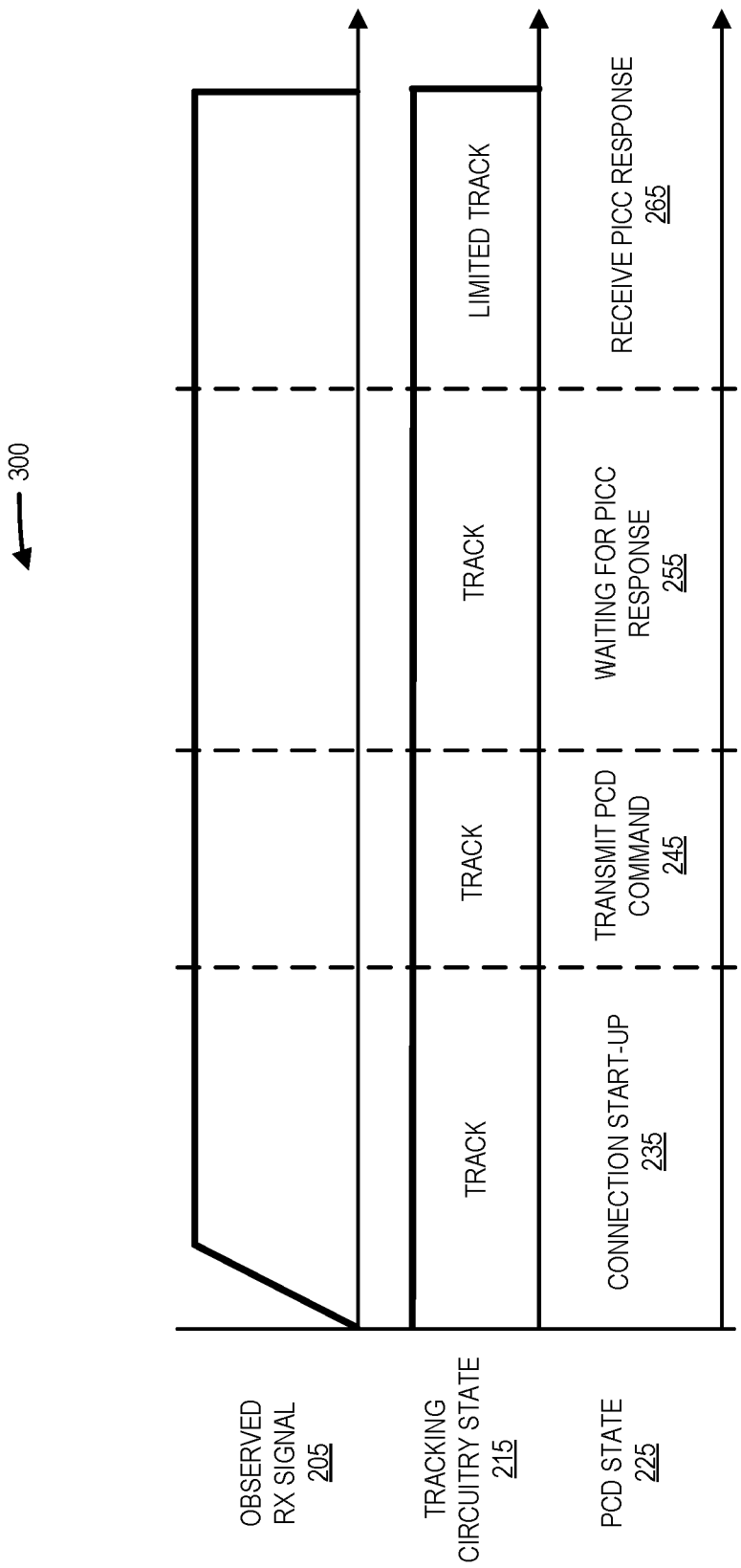
FIG. 3 is a timing diagram of the state of tracking circuitry configured to also track received signals while a PCD command is being transmitted, in accordance with some embodiments.

Referring now to FIG. 3, an example timing diagram 300 of the state of a tracking circuitry configured to track an observed RX signal while a PCD command is transmitted is presented. In embodiments, the example timing diagram 300 presents the state of tracking circuitry 114 (e.g., tracking circuitry state 215) during different PCD operational states 225 of PCD 102. As an example, as demonstrated by the example timing diagram 300, while PCD 102 is in the connection start-up state 235, tracking circuitry 114 is in a track state and is configured to take one or more measurements of one or more properties of observed RX signals 145. Additionally, as demonstrated by example timing diagram 300, when PCD 102 is in a transmit PCD command state 245, tracking circuitry 114 is in a track state and is configured to take one or more measurements of the properties of observed RX signals 145. For example, while PCD 102 is in a transmit PCD command state 245, tracking circuitry 114 is configured to track observed RX signals 145 based on a modulation state indicated by TX modulation envelope 105. That is to say, tracking circuitry 114 is configured to track observed RX signals 145 based on whether a data signal is being modulated on the RF carrier signal 150. As an example, in response to TX modulation envelope 105 being above a predetermined threshold, TX modulation envelope 105 indicates a modulated state. Based on the indicated modulated state (e.g., based on the indication that a data signal is being modulated on RF carrier signal 150), tracking circuitry 114 enters an idle state and does not track observed RX signals 145. Further, in response to TX modulation envelope 105 being below a predetermined threshold, TX modulation envelope 105 indicates an unmodulated state. Based on the indicated unmodulated state (e.g., based on the indication that no data signal is being modulated on RF carrier signal 150), tracking circuitry 114 enters a track state and begins to track observed RX signals 145. According to some embodiments, based on the indicated unmodulated state, tracking circuitry 114 is configured to first wait a predetermined amount of time before tracking observed RX signals 145, for example, to help ensure no data signal is being modulated on RF carrier signal 150.

Additionally, while PCD 102 is in the waiting for PICC response state 255, tracking circuitry 114 is in a track state and is configured to take one or more measurements of the amplitude of observed RX signals 145. Further, while PCD 102 is in a receive PICC response state 265, tracking circuitry 114 is in a limited track state and is configured to measure one or more properties of observed RX signals 145. In embodiments, while in a limited track state, tracking circuitry 114 is configured to take fewer measurements of the properties of observed RX signals 145, take less frequent measurements of the properties of observed RX signals 145, or both than when tracking circuitry 114 is in a track state. As such, as demonstrated by example timing diagram 300, tracking circuitry 114 is configured to track observed RX signals 145 while PCD 102 is in the connection start-up state 235, transmit PCD command state 245, and the waiting for PICC response state 255 before an RF signal indicating a PICC response 135 is received. In this way, the PCD 102 stays close to or quickly reaches a sufficiently optimal set of parameters for the reception of the RF signal indicating a PICC response 135 is increased, helping PCD 102 more accurately predict the state of the RF carrier signal 150. Further, regarding example timing diagram 300, when PCD 102 is in a receive PICC response state 265, tracking circuitry 114 is in a limited track state and is configured to take one or more measurements of one or more properties of observed RX signals 145. According to embodiments, while in a limited track state, tracking circuitry 114 is configured to take fewer measurements of the properties of observed RX signals 145, take less frequent measurements of the properties of observed RX signals 145, or both than when tracking circuitry 114 is in a track state such as during connection start-up state 235, transmit PCD command state 245, and waiting for PICC response state 255.

Figure 4:
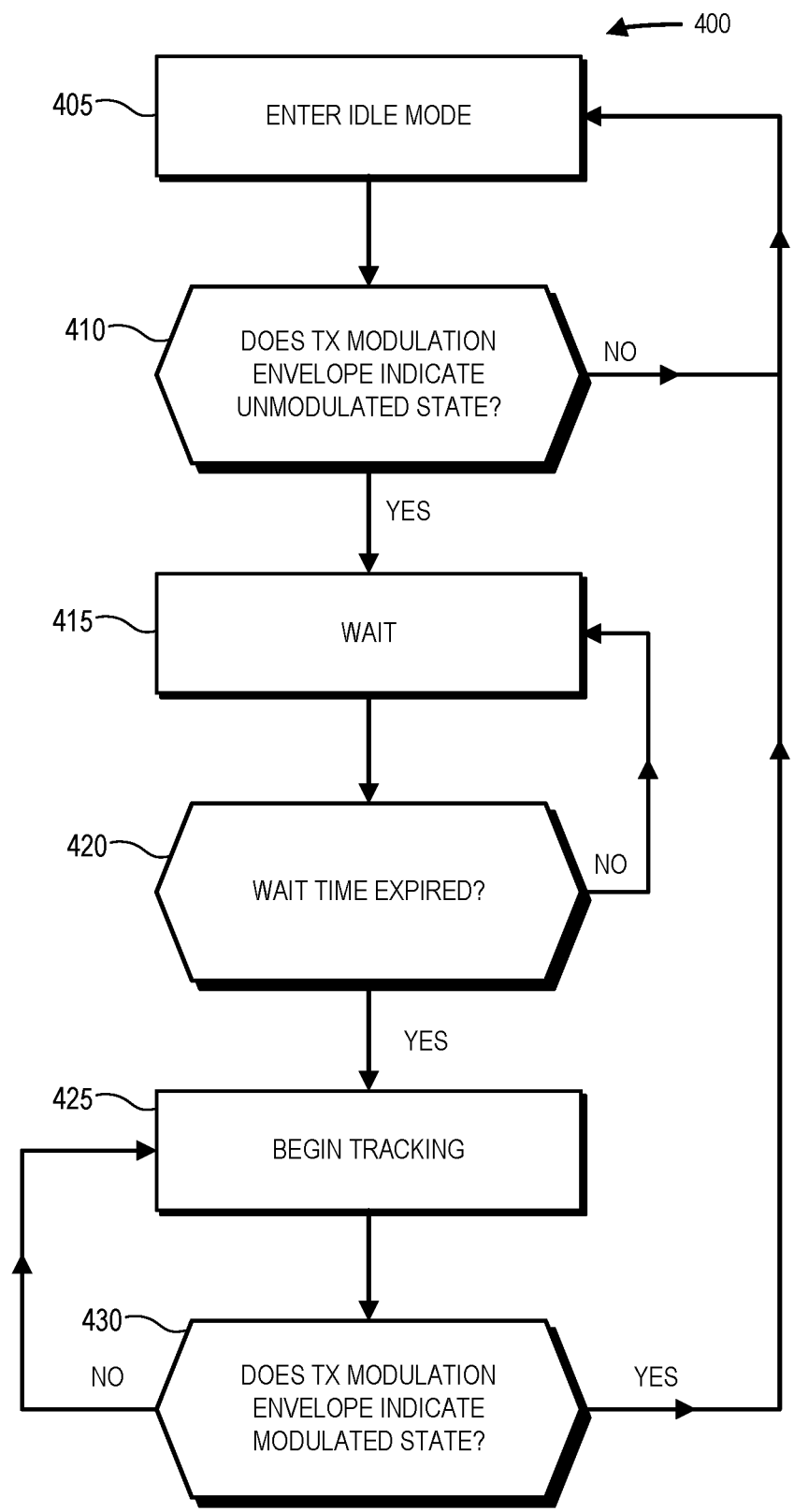
FIG. 4 is a flow diagram of an example method for tracking received signals while a PCD command is transmitted, in accordance with some embodiments.

Referring now to FIG. 4, an example method 400 for tracking an RX signal while a PCD command is transmitted is presented. According to embodiments, example method 400 is implemented by tracking circuitry 114 while PCD 102 is in a transmit PCD command state 245. At block 405 of example method 400, tracking circuitry 114 enters an idle state and is not configured to track observed RX signals 145. That is to say, tracking circuitry 114 does not take one or more measurements of one or more properties (e.g., amplitude, phase, wavelength) of observed RX signals 145. While still in an idle state, tracking circuitry 114 is configured to determine whether TX modulation envelope 105 indicates an unmodulated state at block 410. As an example, tracking circuitry is configured to compare TX modulation envelope 105 to a predetermined threshold value. In response to TX modulation envelope 105 being above the predetermined threshold value (e.g., being high), tracking circuitry 114 determines that TX modulation envelope 105 indicates a modulated state (e.g., that a data signal is being modulated on RF carrier signal 150). Based on the modulated state indicated by TX modulation envelope 105, tracking circuitry 114 remains in an idle state at block 405. Still referring to block 410, in response to TX modulation envelope 105 being below the predetermined threshold value (e.g., being low), tracking circuitry 114 determines that TX modulation envelope 105 indicates an unmodulated state (e.g., that no data signal is being modulated on RF carrier signal 150). Based on the unmodulated state indicated by TX modulated envelope 105, tracking circuitry 114 is configured to enter a wait state at block 415.

Referring now to block 415, while in a wait state, tracking circuitry 114 is configured to wait a predetermined amount of wait time before tracking observed RX signals 145. In this way, tracking circuitry 114 helps ensure that no data signal is being modulated on RF carrier signal 150 when tracking of observed RX signals 145 begins. To this end, at block 420, tracking circuitry 114 determines whether the predetermined amount of wait time has elapsed. That is to say, tracking circuitry 114 determines whether the predetermined amount of time associated with the wait state has expired. In response to the predetermined amount of wait time not having yet elapsed (e.g., the predetermined amount of time associated with the wait state has not expired) tracking circuitry 114 remains in the wait state at block 415. Still referring to block 420, in response to the predetermined amount of wait time having elapsed (e.g., the predetermined amount of time associated with the wait state has expired) tracking circuitry 114 exits the wait state, enters a track state, and begins tracking observed RX signals 145 at block 425. That is to say, at block 425, tracking circuitry 114 takes one or more measurements of one or more properties of observed RX signals 145. According to embodiments, tracking circuitry 114 is configured to track observed RX signals 145 until TX modulation envelope 105 indicates a modulated state. To this end, at block 430, tracking circuitry 114 is configured to determine whether TX modulation envelope 105 indicates a modulated state. In response to TX modulation envelope 105 indicating an unmodulated state (e.g., TX modulation envelope 105 is below a predetermined threshold value), tracking circuitry 114 remains in the track state at block 425. Still referring to block 430, in response to TX modulation envelope 105 indicating a modulated state (e.g., TX modulation envelope 105 is above a predetermined threshold value), tracking circuitry 114 exits the track state and again enters the idle state at block 405. In this way, tracking circuitry 114 is configured to track observed RX signals 145 only when no data signal is modulated on RF carrier signal 150, allowing tracking circuitry 114 to track observed RX signals 145 while PCD 102 is in the transmit PCD command state 245.

Figure 5:
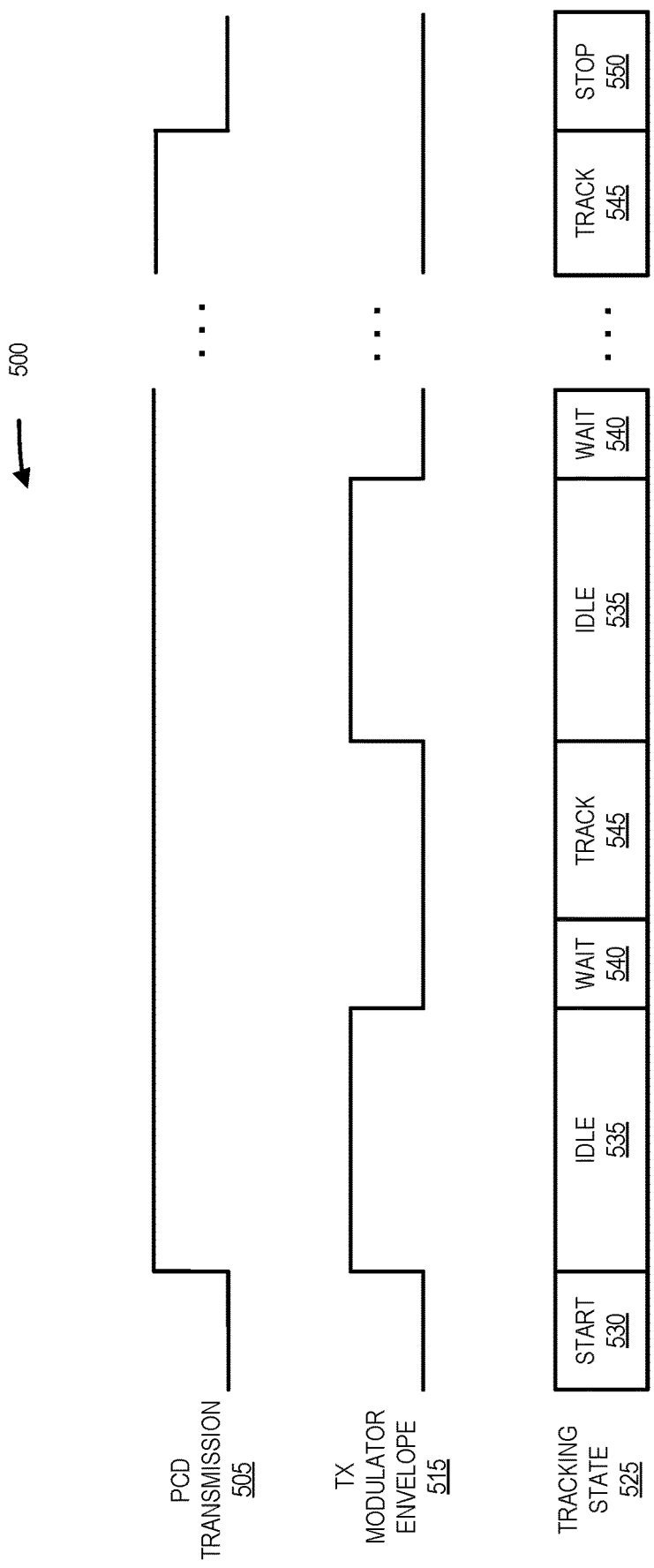
FIG. 5 is a timing diagram of the state of tracking circuitry based on a transmission modulator envelope, in accordance with some embodiments.

Referring now to FIG. 5, an example timing diagram 500 of tracking circuitry states based on a transmission modulator envelope is presented. As an example, example timing diagram 500 demonstrates the state of tracking circuitry 114 (e.g., represented as tracking state 525) based on TX modulator envelope 105. As demonstrated by example timing diagram 500, the state of TX modulator envelope 515 changes while a TX signal 115 indicating a PCD command 125 (e.g., represented as PCD transmission 505) is transmitted from PCD 102 to PICC 126. In embodiments, as PCD 102 enters transmit PCD command state 245 (e.g., before PCD transmission 505 is transmitted), tracking circuitry 114 enters a start state 530 and begins to determine the modulation state indicated by TX modulation envelope 105. That is to say, tracking circuitry 114 determines whether a data signal indicating a PCD command 125 is being modulated on RF carrier signal 150 based on TX modulation envelope 105. For example, tracking circuitry 114 compares the state of TX modulation envelope 515 to a predetermined threshold.

In response to the state of TX modulation envelope 515 being greater than the predetermined threshold (e.g., being high), tracking circuitry 114 determines that the state of TX modulation envelope 515 indicates a modulated state, and tracking circuitry 114 then enters an idle state 535. While in idle state 535, tracking circuitry 114 is configured to not track observed RX signals 145 (e.g., not take any measurements of the properties of observed RX signals 145). In response to the state of TX modulation envelope 515 being less than the predetermined (e.g., being low), tracking circuitry 114 determines that the state of TX modulation envelope 515 indicates an unmodulated state, and tracking circuitry 114 then enters a wait state 540. While in the wait state 540, tracking circuitry 114 is configured to wait a predetermined amount of wait time. Once the predetermined amount of wait time has elapsed, tracking circuitry 114 enters a track state 545. In a track state, tracking circuitry 114 is configured to track observed RX signals 145 for a predetermined amount of track time. That is to say, tracking circuitry 114 takes one or more measurements of the amplitude of observed RX signals 145 for a predetermined amount of track time. After a predetermined amount of track time has elapsed or the tracking circuitry 114 is done for this iteration, tracking circuitry 114 enters idle state 535 or wait state 540 based on the state of TX modulation envelope 515. As an example, in response to TX modulation envelope 515 being high (e.g., being above a predetermined threshold), tracking circuitry 114 determines that TX modulation envelope 515 indicates a modulated state and tracking circuitry 114 again enters an idle state 535. According to embodiments, when PCD transmission 505 ends (e.g., when PCD 102 exits the transmit PCD command state 245), tracking circuitry 114 enters a stop state 550 and stops determining the modulation state indicated by TX modulation envelope 105.

Figure 6:
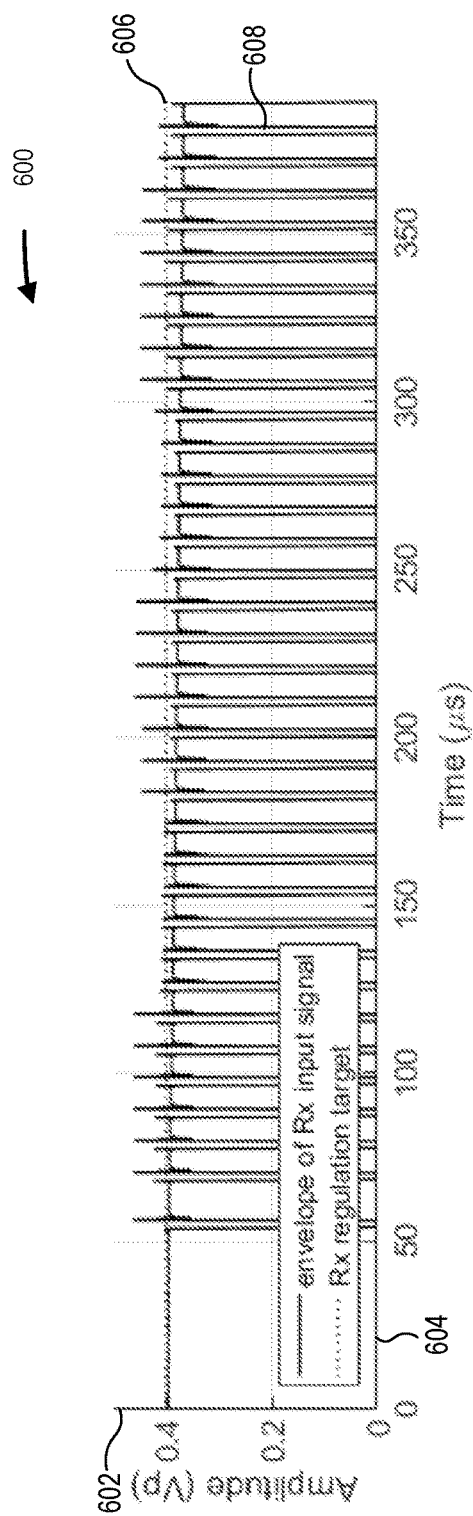
FIG. 6 is a graph representing the amplitude of the envelope of an example received RF signal over time, in accordance with some embodiments.

Referring now to FIG. 6, an example graph 600 representing the amplitude 608 of the envelope of an example received RF signal over time. As an example, example graph 600 represents the amplitude 608 of the envelope of observed RX signals 145 over time. Example graph 600 includes, for example, a first axis 602 (e.g., y-axis) representing the peak voltage of the amplitude 608 of observed RX signals 145 in volts (V). Further, example graph 600 includes a second axis 604 (e.g., x-axis) representing time in microseconds (s). According to embodiments, example graph 600 demonstrates a relationship between the amplitude 608 of observed RX signals 145 and an RX regulation target 606. The RX regulation target 606, for example, represents a predetermined threshold value used by tracking circuitry 114. As an example, in some embodiments, tracking circuitry 114 is configured to compare the measured amplitude 608 of observed RX signals 145 to RX regulation target 606. In response to the measured amplitude 608 of observed RX signals 145 exceeding RX regulation target 606, tracking circuitry is configured to determine one or more parameters for signal gain stages 128, offset compensation 130, or both so as to reduce the measured amplitude 608 of observed RX signals 145 to be closer to (e.g., approaching the value indicated by) RX regulation target 606. Likewise, in response to the measured amplitude of observed RX signals 145 being less than RX regulation target 606, tracking circuitry is configured to determine one or more parameters for signal gain stages 128, offset compensation 130, or both so as to increase the measured amplitude 608 of observed RX signals 145 to be closer to (e.g., approaching the value indicated by) RX regulation target 606. After determining these parameters, tracking circuitry 114 then generates one or more control signals 155 indicating the parameters and provides the control signals 155 to RX front end 118. In this way, tracking circuitry 114 helps keep the amplitude of observed RX signals 145 close to the value indicated by RX regulation target 606.

Figure 7:
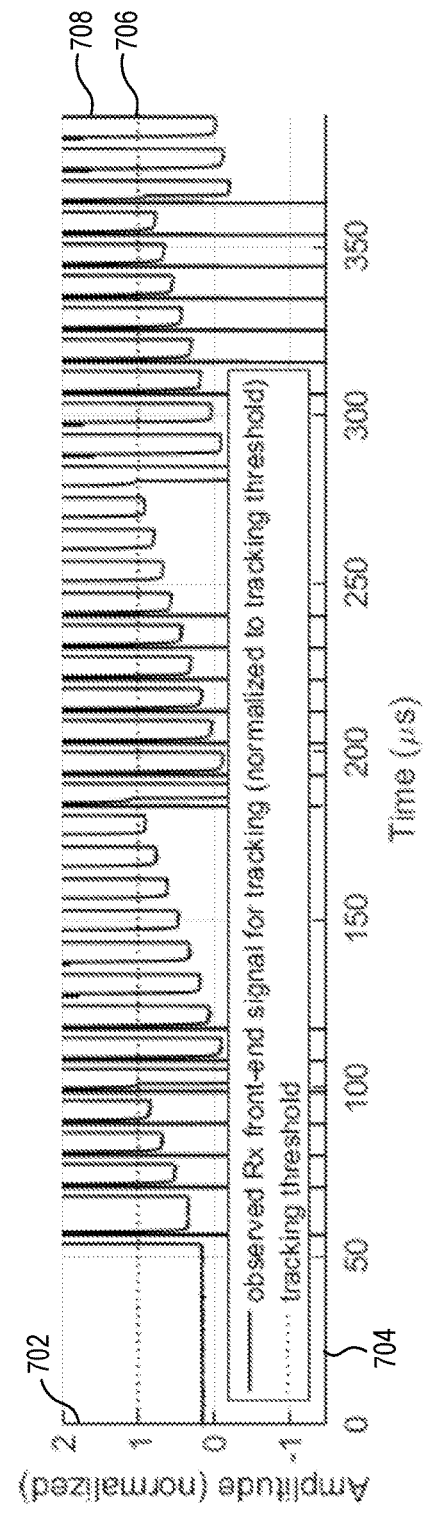
FIG. 7 is a graph representing the normalized amplitude of an example observed RX front-end signal over time, in accordance with some embodiments.

Referring now to FIG. 7, an example graph 700 representing the normalized amplitude of the envelope of an example received RX front-end signal over time. As an example, example graph 700 represents the normalized amplitude of an RX front-end signal 708 over time. Example graph 700 includes, for example, a first axis 702 (e.g., y-axis) representing the normalized voltage of the amplitude of the RX front-end signal 708. Further, example graph 700 includes a second axis 704 (e.g., x-axis) representing time in microseconds (s). According to embodiments, example graph 700 demonstrates a relationship between the normalized amplitude of the RX front-end signal 708 and an RX front-end regulation target 706. The RX front-end regulation target 706, for example, represents a predetermined threshold value used by tracking circuitry 114. As an example, in some embodiments, in response to the measured amplitude of the RX front-end signal being equal to or exceeding RX front-end regulation target 706, tracking circuitry is configured to determine one or more parameters for signal gain stages 128, offset compensation 130, or both so as to reduce the measured amplitude of the RX front-end signal 708 to be closer to (e.g., approaching the value indicated by) RX front-end regulation target 706. Likewise, in response to the measured amplitude of the RX front-end signal being less than RX front-end regulation target 706, tracking circuitry is configured to determine one or more parameters for signal gain stages 128, offset compensation 130, or both so as to increase the measured amplitude of the RX front-end signal 708 to closer to (e.g., approaching the value indicated by) RX front-end regulation target 706 In this way, tracking circuitry 114 helps keep the normalized amplitude of the RX front-end signal close to the value indicated by RX front-end regulation target 706.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-field communication (NFC) device, comprising:
an antenna configured to concurrently transmit a first radio frequency (RF) signal indicating a command and receive a second radio RF signal using one or more NFC protocols; and
a tracking circuitry configured to track a property associated with the received second RF signal while the first RF signal is being transmitted by the antenna.

2. The NFC device of claim 1, further comprising:
a receiver front end configured to modify the received second RF signal based on one or more parameters,
wherein the tracking circuitry is configured to generate the one or more parameters based on the tracked property associated with the second RF signal while the first RF signal was transmitted by the antenna.

3. The NFC device of claim 2, wherein the one or more parameters are associated with a signal gain stage for the received second RF signal.

4. The NFC device of claim 2, wherein the one or more parameters are associated with an offset compensation for the received second RF signal.

5. The NFC device of claim 1, further comprising:
a transmission circuitry configured to modulate the first RF signal indicating the command based on a modulation envelope,
wherein the tracking circuitry is configured to begin tracking the property associated with the received second RF signal based on a modulation state indicated by the modulation envelope.

6. The NFC device of claim 5, wherein the tracking circuitry is configured to wait a predetermined amount of time before tracking the property associated with the received second RF signal in response to the modulation envelope indicating an unmodulated state.

7. The NFC device of claim 5, wherein the tracking circuitry is configured to enter an idle state in response to the modulation envelope indicating a modulated state.

8. A method, comprising:
transmitting, by an antenna, a first radio frequency (RF) signal indicating a command using one or more near-field communication (NFC) protocols;
receiving, by the antenna, a second RF signal concurrently with transmitting the first RF signal; and
tracking a property associated with the received second RF signal while the first RF signal indicating the command is being transmitted by the antenna.

9. The method of claim 8, further comprising:
generating, by a tracking circuitry, one or more parameters based on the tracked property associated with the second RF signal while the first RF signal was being transmitted by the antenna; and
modifying the received second RF signal based on the one or more parameters.

10. The method of claim 9, wherein the one or more parameters are associated with a signal gain stage for the received second RF signal.

11. The method of claim 9, wherein the one or more parameters are associated with an offset compensation for the received second RF signal.

12. The method of claim 8, further comprising:
modulating the first RF signal indicating the command based on a modulation envelope; and
tracking, by a tracking circuitry, the property associated with the received second RF signal based on a modulation state indicated by the modulation envelope.

13. The method of claim 12, further comprising:
waiting, by the tracking circuitry, a predetermined amount of time before tracking the property associated with the received second RF signal in response to the modulation envelope indicating an unmodulated state.

14. The method of claim 12, further comprising:
entering, by the tracking circuitry, an idle state in response to the modulation envelope indicating a modulated state.

15. A near-field communication (NFC) device, comprising:
an antenna configured to receive a first radio frequency (RF) signal using one or more NFC protocols; and
a tracking circuitry configured to track a property associated with the received first RF signal based on a modulation envelope associated with a second RF signal being concurrently transmitted by the antenna.

16. The NFC device of claim 15, further comprising:
a receiver front end configured to modify the received first RF signal based on one or more parameters,
wherein the tracking circuitry is configured to generate the one or more parameters based on the tracked property associated with the received RF signal.

17. The NFC device of claim 16, wherein the one or more parameters are associated with a signal gain stage for the received RF signal.

18. The NFC device of claim 16, wherein the one or more parameters are associated with an offset compensation for the received RF signal.

19. The NFC device of claim 15, wherein the tracking circuitry is configured to wait a predetermined amount of time before tracking the property associated with the received first RF signal in response to the modulation envelope indicating an unmodulated state.

20. The NFC device of claim 15, wherein the tracking circuitry is configured to enter an idle state in response to the modulation envelope indicating a modulated state.

* * * * *